United States Patent
Ren et al.

(10) Patent No.: US 8,922,177 B2
(45) Date of Patent: Dec. 30, 2014

(54) MULTIPHASE CONVERTER WITH CONTROLLABLE PHASE SHIFT

(75) Inventors: Yuancheng Ren, Hangzhou (CN); Eric Yang, Saratoga, CA (US); Qian Ouyang, Hangzhou (CN); Xiaoming Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 298 days.

(21) Appl. No.: 13/457,831

(22) Filed: Apr. 27, 2012

(65) Prior Publication Data

US 2012/0274293 A1 Nov. 1, 2012

(30) Foreign Application Priority Data

Apr. 29, 2011 (CN) .......................... 2011 1 0115571

(51) Int. Cl.
*G05F 1/00* (2006.01)
*H02M 3/158* (2006.01)

(52) U.S. Cl.
CPC .... *H02M 3/1584* (2013.01); *H02M 2003/1586* (2013.01)
USPC .......................................... 323/271; 323/282

(58) Field of Classification Search
USPC ................... 323/222–225, 270–277, 280–288
See application file for complete search history.

(56) References Cited

U.S. PATENT DOCUMENTS

| | | | | |
|---|---|---|---|---|
| 4,290,108 A | * | 9/1981 | Woehrle et al. | 702/124 |
| 5,079,498 A | * | 1/1992 | Cleasby et al. | 323/283 |
| 5,844,193 A | * | 12/1998 | Nomura et al. | 219/110 |
| 6,218,795 B1 | * | 4/2001 | Syukuri | 318/400.17 |
| 6,433,527 B1 | * | 8/2002 | Izadinia et al. | 323/300 |
| 6,541,933 B1 | * | 4/2003 | Leggate et al. | 318/599 |
| 8,193,743 B2 | * | 6/2012 | Yamada et al. | 318/162 |
| 8,604,730 B2 | * | 12/2013 | Suzuki | 318/400.02 |
| 2004/0227495 A1 | * | 11/2004 | Egan et al. | 323/272 |
| 2005/0174076 A1 | * | 8/2005 | Katanaya | 318/254 |
| 2007/0103136 A1 | * | 5/2007 | Jain | 323/282 |
| 2007/0253223 A1 | * | 11/2007 | Neidorff et al. | 363/2 |
| 2009/0058337 A1 | * | 3/2009 | Kato et al. | 318/400.09 |
| 2009/0058379 A1 | * | 3/2009 | Sreenivas | 323/241 |
| 2009/0066286 A1 | * | 3/2009 | Gunji | 318/490 |
| 2009/0073617 A1 | * | 3/2009 | Gunji | 361/23 |
| 2009/0230899 A1 | * | 9/2009 | Arimura et al. | 318/400.01 |
| 2010/0097041 A1 | * | 4/2010 | Ayukawa et al. | 323/272 |
| 2010/0097828 A1 | * | 4/2010 | Chen | 363/72 |
| 2010/0127789 A1 | * | 5/2010 | Kenly et al. | 332/109 |
| 2010/0134080 A1 | | 6/2010 | Ouyang | |
| 2010/0181983 A1 | | 7/2010 | Ouyang | |
| 2010/0213856 A1 | * | 8/2010 | Mizusako | 315/158 |

(Continued)

OTHER PUBLICATIONS

U.S. Appl. No. 13/324,504, filed Dec. 13, 2011, Li, Xiaoming.

*Primary Examiner* — Timothy J Dole
*Assistant Examiner* — Yusef Ahmed
(74) *Attorney, Agent, or Firm* — Perkins Coie LLP

(57) ABSTRACT

A multiphase converter has a plurality of phase circuits and a plurality of phase control circuits. Each phase circuit has a switch having a control terminal, and the control terminal of the switch may be configured to receive a drive signal. Each phase control circuit may be corresponding to one of the phase circuits, and each phase control circuit may be configured to provide a phase control signal to adjust an ON-time period or a reference signal for the corresponding phase circuit. The phase control signal may be responsive to the drive signal of the corresponding phase circuit.

17 Claims, 13 Drawing Sheets

(56) References Cited

U.S. PATENT DOCUMENTS

| | | | |
|---|---|---|---|
| 2010/0244789 A1* | 9/2010 | Osaka | 323/271 |
| 2010/0315052 A1* | 12/2010 | Zambetti et al. | 323/282 |
| 2011/0025284 A1 | 2/2011 | Xu et al. | |
| 2011/0221408 A1* | 9/2011 | Martin et al. | 323/272 |
| 2012/0091977 A1* | 4/2012 | Carroll et al. | 323/271 |

* cited by examiner

MULTIPHASE CONVERTER WITH CONTROLLABLE PHASE SHIFT

CROSS-REFERENCE TO RELATED APPLICATION(S)

This application claims the benefit of CN application No. 201110115571.6, filed on Apr. 29, 2011, and incorporated herein by reference.

TECHNICAL FIELD

This invention relates generally to electrical circuits, and more particularly but not exclusively to multiphase converters.

BACKGROUND

DC-DC converters are used in difference applications, particularly consumer electronics, such as notebook, desktop, personal digital assistant (PDA) and so on. The DC-DC converters need to be able to provide a stable power supply to electronic device at a preset and stable voltage.

Constant ON-time DC/DC converters are widely used due to their excellent load transient response, high efficiency, simple configuration and small size. FIG. 1 schematically illustrates a traditional DC/DC converter 100 with constant ON-time control. When an output voltage Vout of the converter is lower than a preset voltage, the converter is configured to provide power from an input terminal to an output terminal. As one example shown in FIG. 1, output voltage Vout is sensed via a voltage divider comprising a resistor 106 and a resistor 107, the common node of resistor 106 and resistor 107 is configured to provide a feedback signal FB. Feedback signal FB is coupled to a comparator 108 and is compared with a reference signal Vref which is constant and predetermined. When feedback signal FB is less than reference signal Vref, a driving circuit 109 coupled to an output of comparator 108 is configured to provide an activating drive signal PWM1 to turn ON a high-side switch 101, then a current is supplied from the input terminal to the output terminal. An ON-time count circuit 110 coupled to driving circuit 109 is employed to provide a preset constant ON-time period TON for high-side switch 101, and high-side switch 101 is turned OFF after ON-time period TON expired.

FIG. 2 schematically illustrates a dual-phase DC/DC converter 200. As shown in FIG. 2, dual-phase DC/DC converter 200 comprises a first phase circuit and a second phase circuit. The first phase circuit comprises switch 101, a switch 102 and an inductor 103, and the second phase circuit comprises a switch 201, a switch 202 and an inductor 203. ON-time count circuit 110 and driving circuit 109 are employed to supply drive signal PWM1 to switch 101, and an ON-time count circuit 210 and a driving circuit 209 are employed to supply a drive signal PWM2 to switch 201. The same as converter 100, when feedback signal FB is less than reference signal Vref, comparator 108 is configured to provide an activating signal SET (e.g., signal SET is logic HIGH), and activating signal SET is distributed to driving circuit 109 and driving circuit 209 alternately via a frequency divider 211 as shown in FIG. 4. When signal SET is activated, drive signal PWM1 and drive signal PWM2 are set activated alternately, switch 101 and switch 201 is then turned ON alternately. When switch 101 is turned ON, ON-time count circuit 110 starts to count, and switch 101 is turned OFF until ON-time period TON has expired. When switch 201 is turned ON, ON-time count circuit 210 starts to count, and switch 201 is turned OFF until ON-time period TON has expired.

FIG. 3 schematically illustrates a multiphase DC/DC converter 300 comprising N phase circuits, wherein N is an integer and larger than 1. Similar with converter 200, activating signal SET is distributed to each phase circuit alternately via a frequency divider 311. When signal SET is activated, switches of each phase circuit are turned ON alternately, an ON-time count circuit corresponding to an activated phase circuit starts to count, and each switch is turned OFF until ON-time period TON has expired.

FIG. 4 shows waveforms illustrating signals of converter 200. For multiphase converter, when parameters, e.g., inductance, resistance, ON-time period and so on, of different phase circuits are the same as each other, phase shift of each phase circuit is generated automatically and phase interleaving may be symmetry. But as FIG. 4 shown, phase interleaving is not perfect, i.e., for dual-phase converter, phase shift between the phase circuits is not 180 degree, per any parameter of different phase circuits is different. As a result, different phase circuits may under different electrical stress.

Thus, a multiphase converter with controllable phase shift is needed to achieve phase symmetry even with different parameters.

SUMMARY

In one embodiment, a multiphase converter comprising N phase circuits is disclosed, wherein N is an integer larger than 1. The multiphase converter may comprise a plurality of phase circuits and a control circuit. Each phase circuit may comprise a switch having a control terminal configured to receive a drive signal. The control circuit may have a plurality of outputs configured to provide drive signals. The control circuit may be configured to provide a plurality of drive signals, and may comprise a plurality of phase control circuits. Each phase control circuit is corresponding to one of the phase circuits, and each phase control circuit is configured to provide a phase control signal to adjust a circuit parameter for a corresponding phase circuit. The phase control signal may be responsive to a drive signal of the corresponding phase circuit. In one embodiment, the circuit parameter comprises an ON-time period for the corresponding phase circuit. In another embodiment, the circuit parameter comprises a reference signal for the corresponding phase circuit.

In one embodiment, a phase control method for a phase circuit of a multiphase converter comprising N phase circuits is disclosed. A phase control signal may be provided to adjust a circuit parameter for the phase circuit to adjust a phase shift of the phase circuit.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Several embodiments of the present invention are described below with reference to multiphase converter and associated method of operation. As used hereinafter, the term "couple" generally refers to multiple ways including a direct connection with an electrical conductor and an indirect connection through intermediate diodes, resistors, capacitors, and/or other intermediaries. The term "switch" generally refers to a semiconductor device composed of semiconductor material with at least two terminals for connection to an external circuit. The term "system ground" generally refers the reference point from which other voltages are measured and generally serves as a common return path for electric current. The term "phase symmetric" generally means that phasing of the phase circuits has symmetric distribution, e.g., for a converter comprising N phase circuits, each phase circuit is shifted 360/N degree away from the previous effective phase. The term "duration time period" generally refers to a time period during which a phase circuit is effective, e.g., duration time period of the phase circuit refers to a time period from a switch of the phase circuit is turned ON to a switch of a next phase circuit is turned ON.

Figure 1:
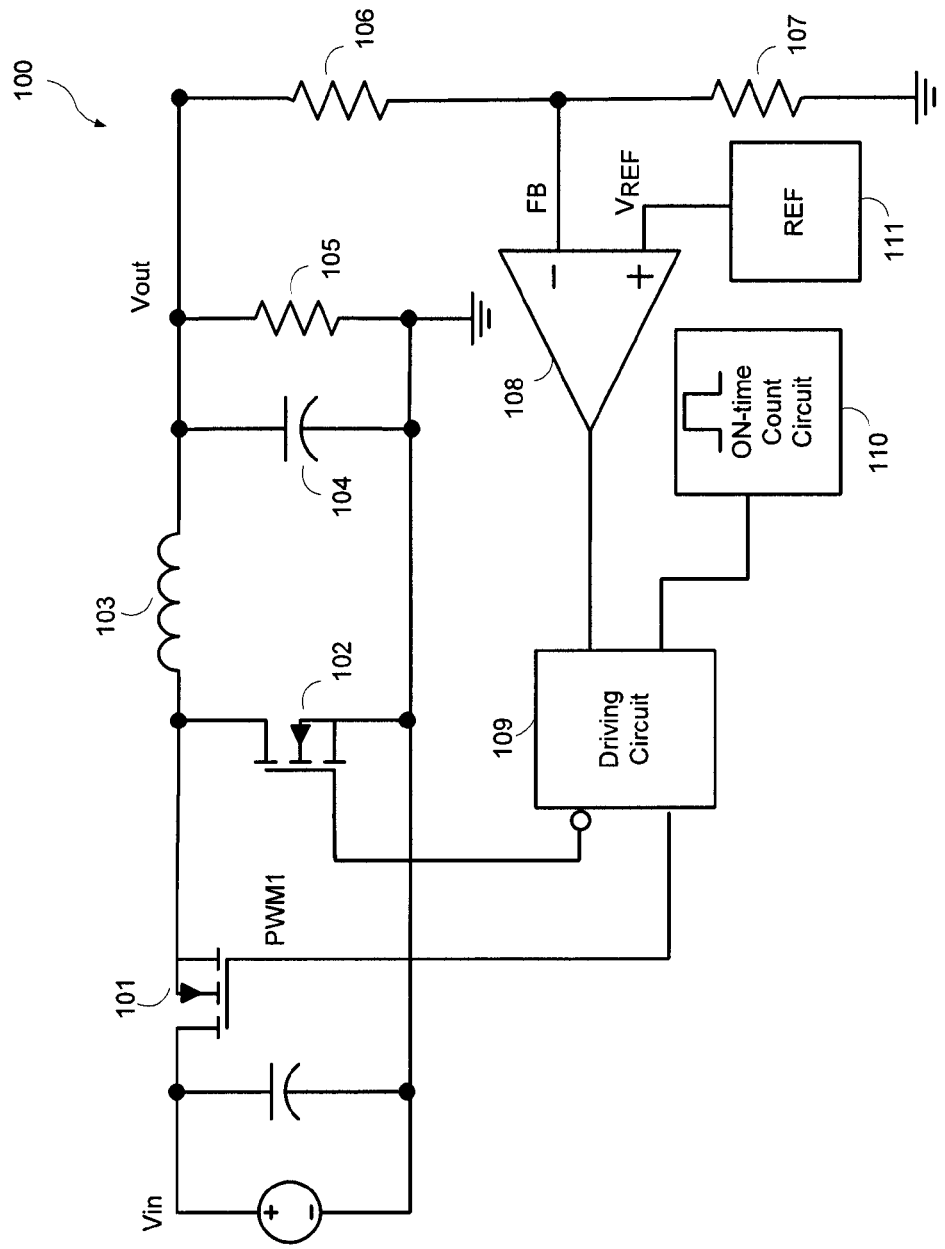
FIG. 1 schematically illustrates a traditional DC/DC converter 100 with constant ON-time control.
Figure 2:
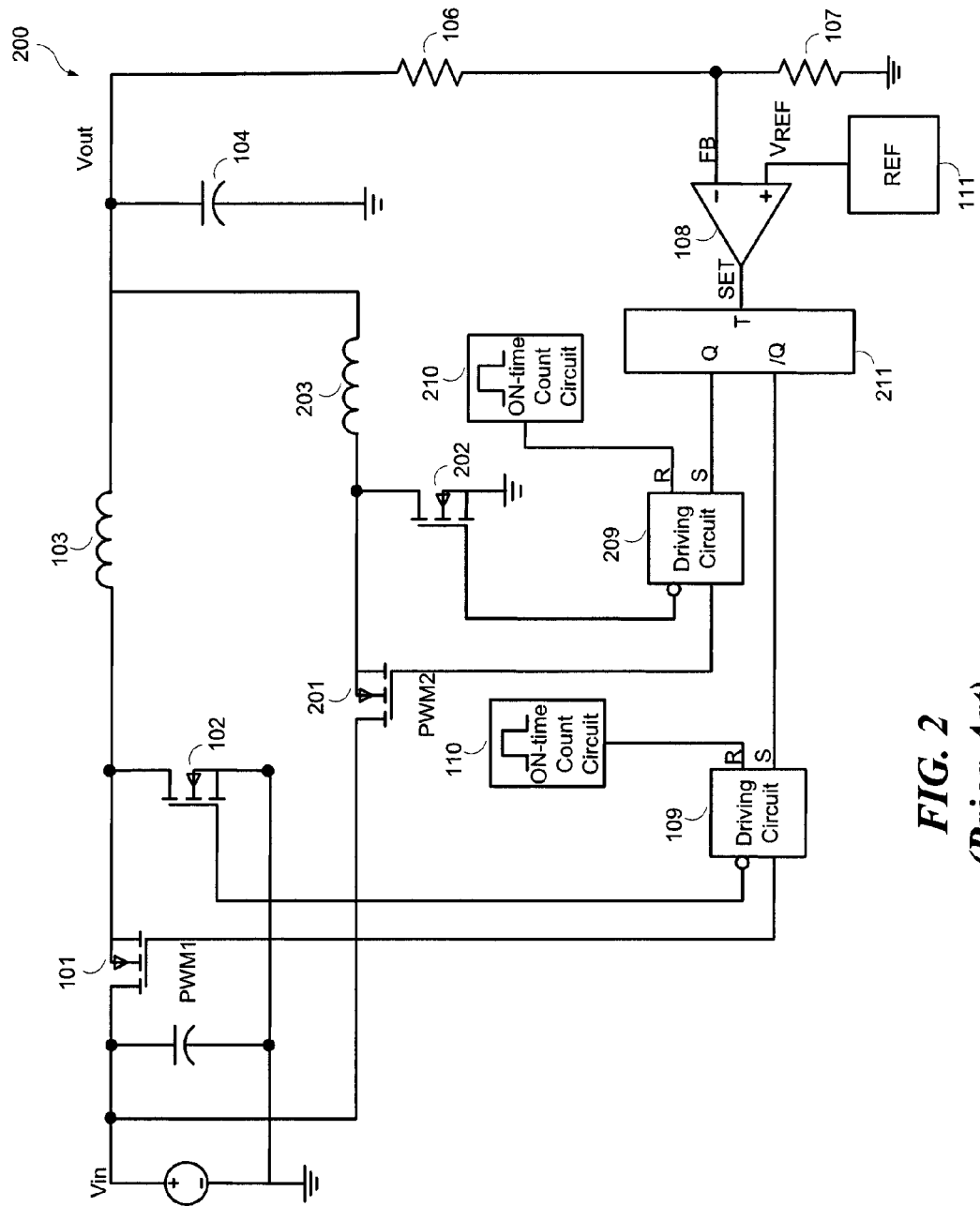
FIG. 2 schematically illustrates a traditional dual-phase DC/DC converter 200 with constant ON-time control.
Figure 3:
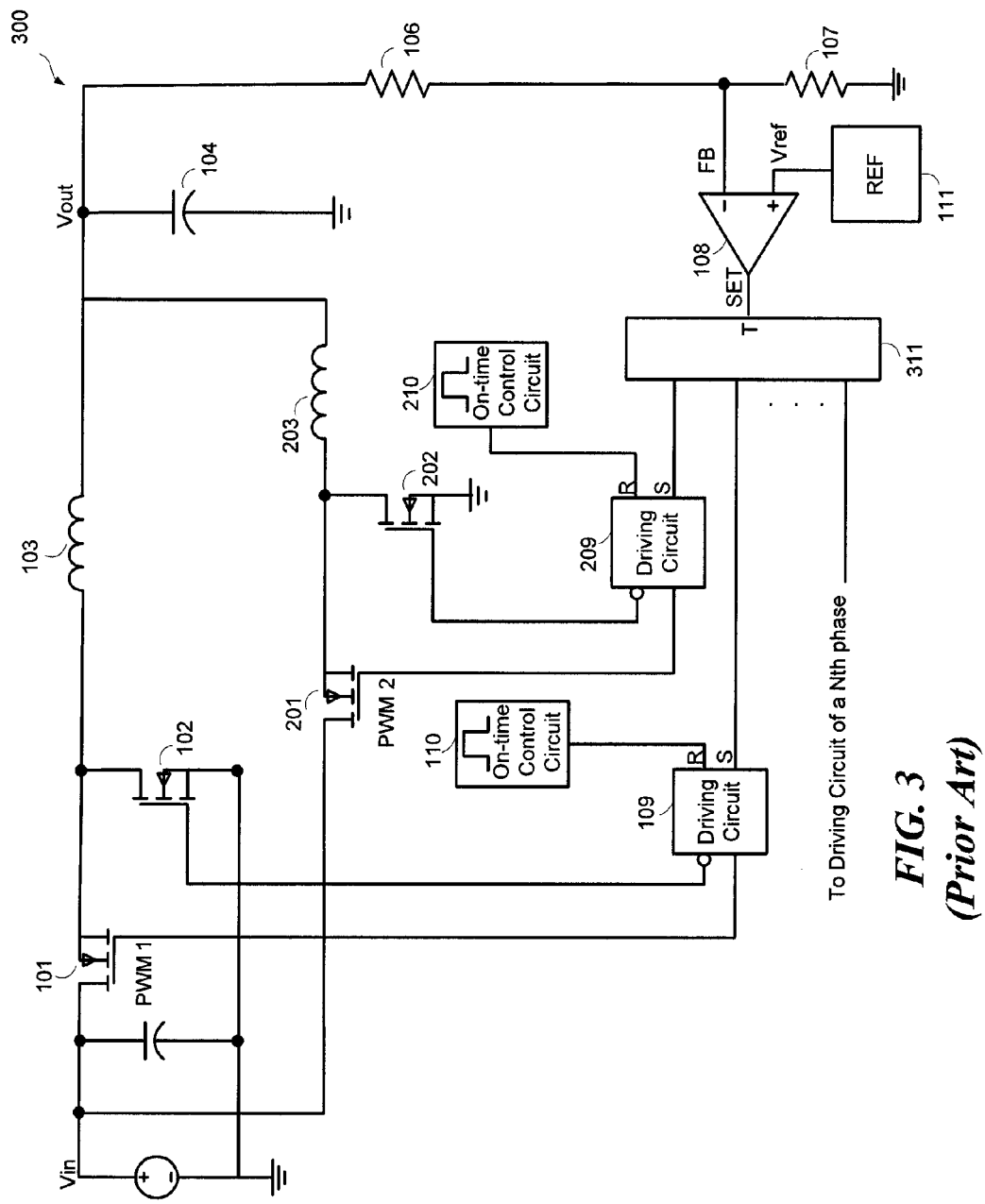
FIG. 3 schematically illustrates a traditional multiphase DC/DC converter 300 with constant ON-time control.
Figure 4:
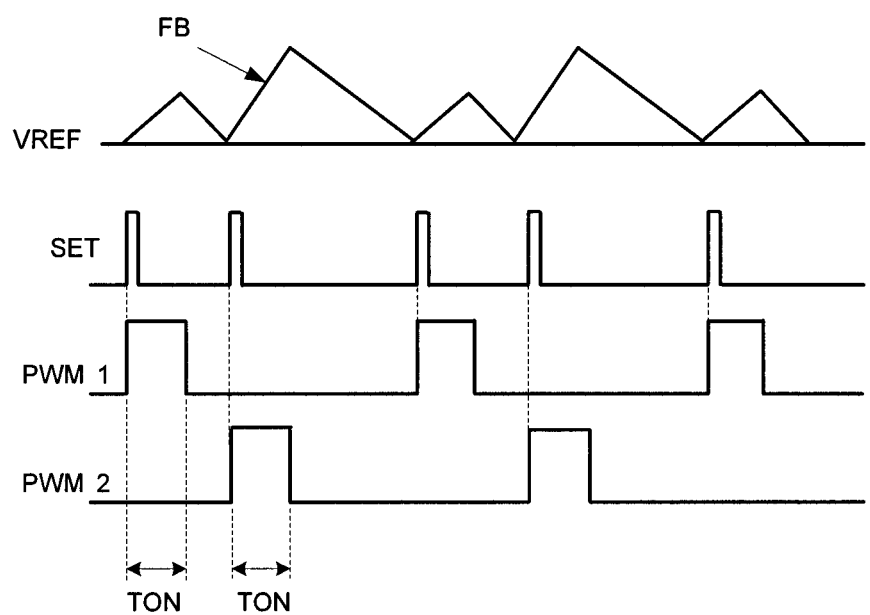
FIG. 4 shows waveforms illustrating signals of converter 200.
Figure 5A:
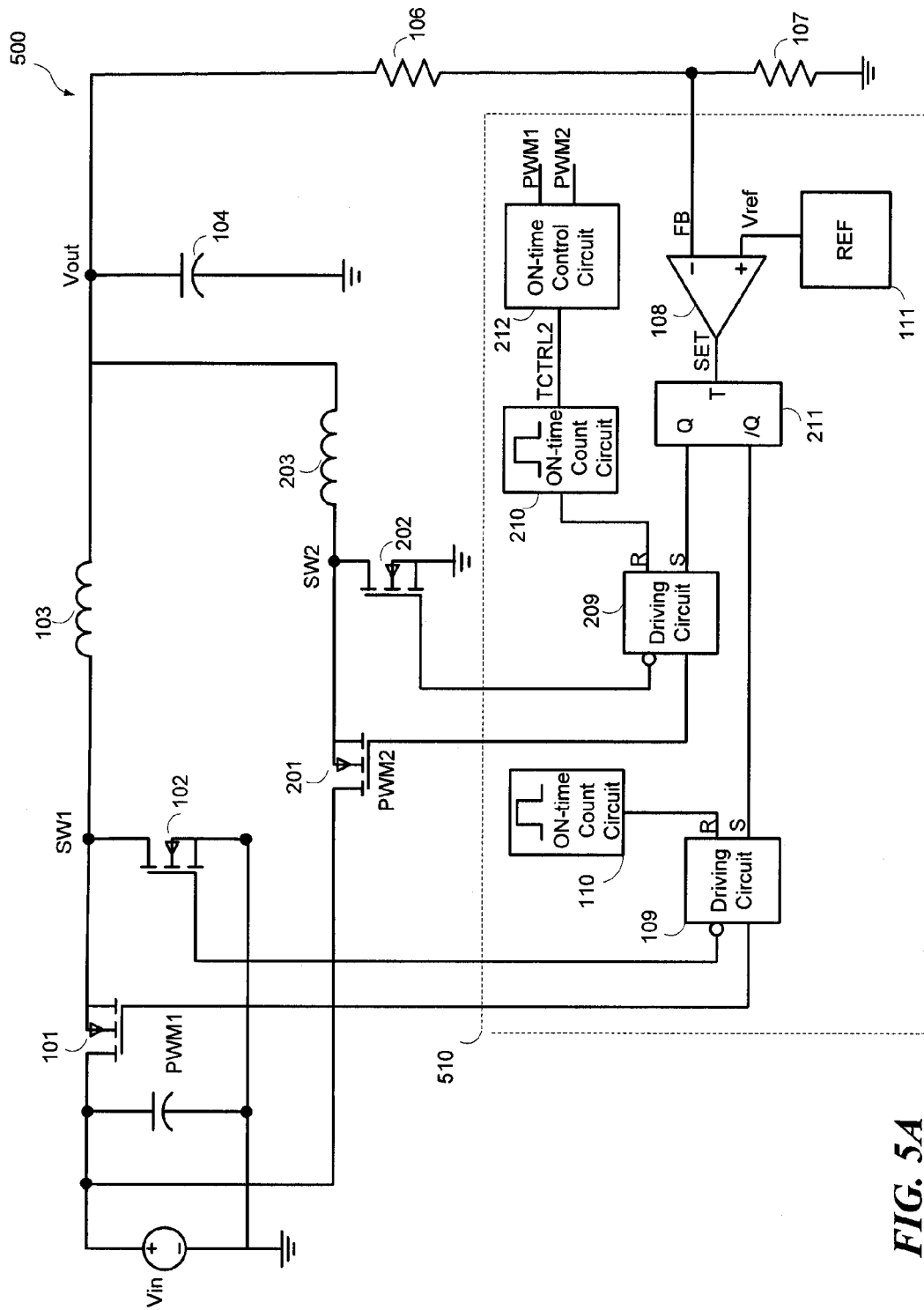
FIG. 5A schematically illustrates a dual-phase DC/DC converter 500 with constant ON-time control in accordance with an embodiment of the present invention.

FIG. 5A schematically illustrates a dual-phase DC/DC converter 500 with constant ON-time control in accordance with an embodiment of the present invention. Converter 500 has an input coupled to receive an input voltage Vin and an output coupled to provide an output voltage Vout. Converter 500 comprises a power stage having a first phase circuit and a second phase circuit, and comprises a control circuit 510. The difference between converter 200 as shown in FIG. 2 and converter 500 is that the control circuit 510 further comprises an ON-time control circuit 212, i.e., a phase control circuit. ON-time control circuit 212 is configured to provide a phase control signal TCTRL2 to adjust an ON-time period TON2 for the second phase circuit to achieve phase symmetry. Phase control signal TCTRL2 is responsive to a drive signal PWM1 of the first phase circuit and a drive signal PWM2 of the second phase circuit.

In one embodiment, the first phase circuit comprises a switch 101, a switch 102 and an inductor 103. In one embodiment, the second phase circuit comprises a switch 201, a switch 202 and an inductor 203. Persons of ordinary skill in the art will recognize, however, converter 500 may comprise more components, such as resistors, capacitors, diodes, or other electrical devices without detracting from the spirit of the present invention. In one embodiment, switch 101 and/or switch 201 may be metal-oxide semiconductor field effect transistor (MOSFET), junction field effect transistor (JFET), bipolar junction transistor (BJT), insulated gate bipolar translator (IGBT) or other types of transistor. In one embodiment, switch 101 is an N type MOSFET and switch 201 is an N type MOSFET as shown in FIG. 5A. One of ordinary skill in the art will note that P type MOSFET may also be used as switch 101 and/or as switch 201 without detracting from the merits of the present invention. In one embodiment, switch 102 and/or switch 202 may be transistor, diode or other types of switch. In one embodiment, switch 102 is an N type MOSFET and switch 202 is an N type MOSFET as shown in FIG. 5A.

In one embodiment, switch 101 comprises a first terminal configured to receive input voltage Vin, a second terminal coupled to a first terminal of inductor 103 at node SW1, and a control terminal configured to receive drive signal PWM1. A second terminal of inductor 103 is coupled to provide output voltage Vout. Switch 102 comprises a first terminal coupled to the second terminal of switch 101 at node SW1, a second terminal coupled to a system ground. In one embodiment, switch 102 comprises a control terminal configured to receive a drive signal which may be complementary with drive signal PWM1. In one embodiment, switch 201 comprises a first terminal configured to receive input voltage Vin, a second terminal coupled to a first terminal of inductor 203 at node SW2, and a control terminal configured to receive drive signal PWM2. A second terminal of inductor 203 is coupled to provide output voltage Vout. Switch 202 comprises a first terminal coupled to the second terminal of switch 201 at node SW2, a second terminal coupled to the system ground. In one embodiment, switch 202 comprises a control terminal configured to receive a drive signal which may be complementary with drive signal PWM2.

ON-time control circuit 212 is employed as a phase control circuit which is configured to provide phase control signal TCLRL2 to the second phase circuit. ON-time control circuit 212 comprises a first input configured to receive drive signal PWM1, a second input configured to receive drive signal PWM2, and an output configured to provide phase control signal TCLRL2. In one embodiment, taking the first phase circuit as a master phase circuit and the second phase circuit as a slave phase circuit, phase control signal TCTRL2 is configured to adjust ON-time period TON2 of switch 201 of the second phase circuit to achieve phase symmetry, and an ON-time period TON1 of switch 101 of the first phase circuit is predetermined as a constant value and will not be adjusted for phase symmetry.

Control circuit 510 may further comprise a comparator 108, a frequency divider 211, a driving circuit 109, an ON-time count circuit 110, a driving circuit 209 and an ON-time count circuit 210. Comparator 108 comprises an inverting terminal coupled to the output of converter 500, a non-inverting terminal configured to receive a reference signal Vref, and an output configured to provide a signal SET. In one embodiment, the output of converter 500 is coupled to comparator 108 through a voltage divider comprising a resistor 106 and a resistor 107. A feedback signal FB at a common node of resistor 106 and resistor 107 is coupled to the inverting terminal of comparator 108. In one embodiment, a voltage source REF may be employed to provide reference signal Vref. When feedback signal FB is less than reference signal Vref, signal SET is set activated, e.g., logic HIGH. Frequency divider 211 comprises an input coupled to the output of comparator 108, a first output coupled to a set terminal of driving circuit 109, and a second output coupled to a set terminal of driving circuit 209. Frequency divider 211 is employed to distribute activating signal SET to driving circuit 109 and driving circuit 209 alternately. A reset terminal of driving circuit 109 is coupled to an output of ON-time count circuit 110 to receive ON-time period TON1. Driving circuit 109 is configured to provide drive signal PWM1. A reset terminal of driving circuit 209 is coupled to an output of ON-time count circuit 210 to receive ON-time period TON2. Driving circuit 209 is configured to provide drive signal PWM2.

ON-time count circuit 110 is configured to provide ON-time period TON1 to driving circuit 109 and ON-time count circuit 210 is configured to provide ON-time period TON2 to drive circuit 209. When switch 101 is turned ON, ON-time count circuit 110 starts to count. In one embodiment, ON-time count circuit 110 may comprise an input configured to receive drive signal PWM1. When switch 201 is turned ON, ON-time count circuit 210 starts to count. In one embodiment, ON-time count circuit 210 may comprise an input configured to receive drive signal PWM2. In one embodiment, ON-time count circuit 210 is coupled to the output of ON-time control circuit 212 and is configured to provide adjusted ON-time period TON2 to achieve symmetry phase interleaving. When drive signal PWM1 is activated, switch 101 is turned ON until ON-time period TON1 has expired. When drive signal PWM2 is activated, switch 201 is turned ON until ON-time period TON2 has expired.

Figure 5B:
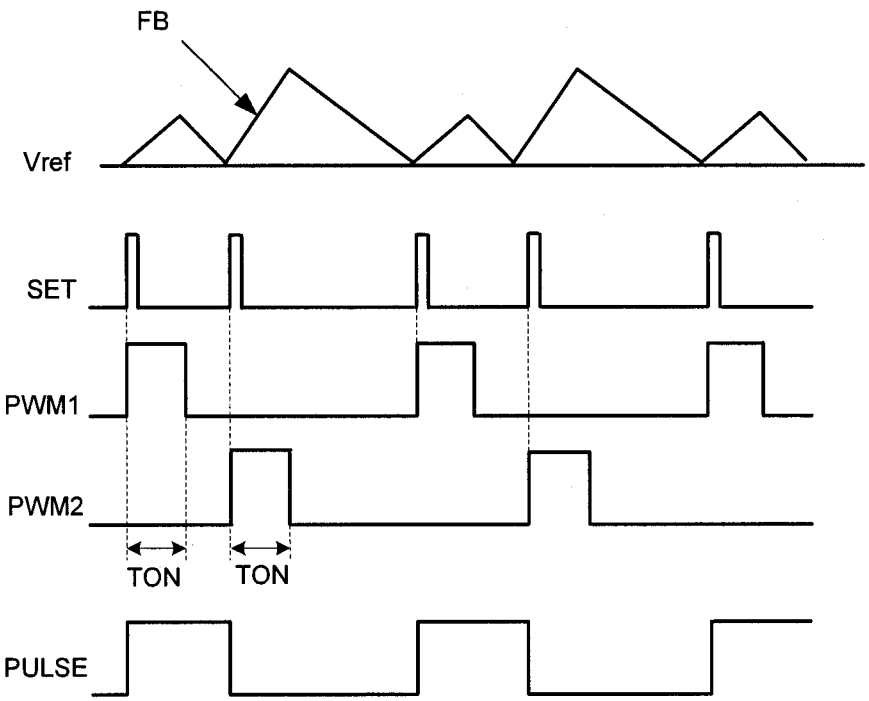
FIG. 5B shows waveforms illustrating signals of converter 500 in accordance with an embodiment of the present invention.

FIG. 5B shows waveforms illustrating signals of converter 500 in accordance with an embodiment of the present invention. As shown in FIG. 5B, when feedback signal FB is less than reference signal Vref, signal SET becomes logic HIGH, and drive signal PWM1 and drive signal PWM2 are set HIGH alternately. ON-time period TON1 of the first phase circuit and ON-time period TON2 of the second phase circuit may be set as a predetermined initial ON-time period TON at the very beginning. In the example of FIG. 5B, an indicating signal PULSE is generated to indicate a phase shift of the second phase circuit away from the first phase circuit. Indicating signal PULSE is flipped at a HIGH level voltage VH and a LOW level voltage VL alternately when drive signal PWM1 or drive signal PWM2 becomes activated. In one embodiment, indicating signal PULSE becomes HIGH at a leading edge of drive signal PWM1, and becomes LOW at a leading edge of drive signal PWM2. If a time period of HIGH indicating signal PULSE equals a time period of LOW indicating signal PULSE, then phase interleaving is indicated as symmetry. As shown in FIG. 5B, phase interleaving may be not symmetry when any parameter, e.g., inductance and/or resistance, of different phase circuits is different.

Figure 5C:
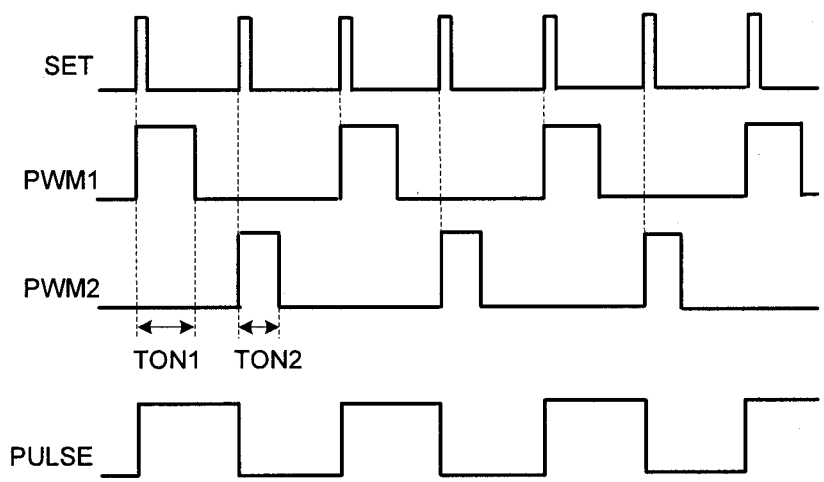
FIG. 5C shows waveforms illustrating signals of converter 500 to adjust an ON-time period of a phase circuit to implement symmetry phase interleaving.

FIG. 5C shows waveforms illustrating signals of converter 500 to adjust ON-time period TON2 of the second phase circuit to implement symmetry phase interleaving. In one embodiment, ON-time period TON2 of the second phase circuit is adjusted to achieve phase symmetry. For example, when a duration time period of the first phase circuit is shorter than a duration time period of the second phase circuit, i.e., the time period of HIGH indicating signal PULSE is shorter than the time period of LOW indicating signal PULSE, an average voltage Vavr of indicating signal PULSE is less than (VH+VL)/2, ON-time period TON2 is decreased to adjust the phase shift of the second phase circuit. When the duration time period of the first phase circuit is longer than the duration time period of the second phase circuit, i.e., the time period of HIGH indicating signal PULSE is longer than the time period of LOW indicating signal PULSE, average voltage Vavr of indicating signal PULSE is larger than (VH+VL)/2, ON-time period TON2 is increased to adjust the phase shift of the second phase circuit.

Thus, the duration time period of the second phase circuit is adjusted to achieve symmetry phase interleaving via adjusting ON-time period TON2.

Figure 5D:
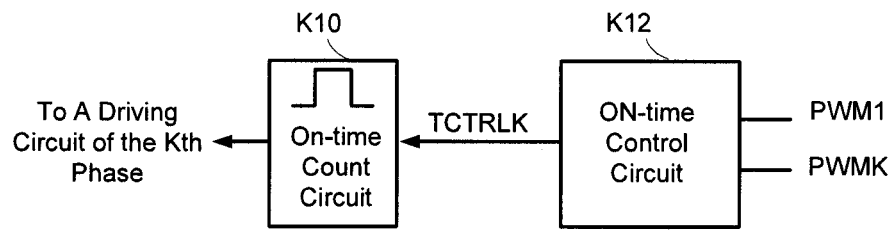
FIG. 5D schematically illustrates an ON-time control circuit of a multiphase DC/DC converter comprising N phase circuits in accordance with an embodiment of the present invention.

Similarly, For multiphase converter comprising N phase circuits, wherein N is an integer larger than 1, taking one phase circuit, e.g., a first phase circuit, as a master phase circuit, an ON-time control circuit K12 as shown in FIG. 5D is employed to adjust an ON-time period of a corresponding phase circuit, i.e., an ON-time period TONK of a Kth phase circuit, where K is an integer, and $1<K\leq N$. FIG. 5D schematically illustrates ON-time control circuit K12 of a multiphase DC/DC converter comprising N phase circuits in accordance with an embodiment of the present invention. As shown in FIG. 5D, multiphase converter comprises ON-time control circuit K12 and an ON-time count circuit K10 to the Kth phase circuit. ON-time control circuit K12 comprises a first input coupled to drive signal PWM1 of the master phase circuit, a second input coupled to a drive signal PWMK of the Kth phase circuit, and an output coupled to ON-time count circuit K10 to provide a phase control signal TCTRLK. ON-time count circuit K10 comprises an input configured to receive phase control signal TCTRLK and an output coupled to a driving circuit of the Kth phase circuit. Phase control signal TCTRLK is employed to adjust ON-time period TONK of the Kth phase circuit according to drive signal PWM1 and drive signal PWMK.

In one embodiment, an indicating signal PULSEK is generated to indicate a phase shift of the Kth phase circuit away from the master phase circuit in accordance with drive signal PWM1 and drive signal PWMK. Indicating signal PULSEK is flipped at HIGH level voltage VH and LOW level voltage VL alternately when drive signal PWM1 or drive signal PWMK becomes activated. In one embodiment, indicating signal PULSEK becomes HIGH at a leading edge of drive signal PWM1, and becomes LOW at a leading edge of drive signal PWMK. In one embodiment, when the duration time period of the master phase circuit is shorter than a duration time period of the Kth phase circuit, an average voltage Vavrk of indicating signal PULSEK is less than $(K-1)(VH+VL)/N$, ON-time period TONK of the Kth phase circuit is decreased to adjust the phase shift of the Kth phase circuit. In one embodiment, when the duration time period of the master phase circuit is longer than the duration time period of the Kth phase circuit, average voltage Vavrk of indicating signal PULSEK is larger than $(K-1)(VH+VL)/N$, ON-time period TONK of the Kth phase circuit is increased to adjust the phase shift of the Kth phase circuit.

Thus, the duration time period of the Kth phase circuit is adjusted to achieve phase symmetry between the master phase circuit and the Kth phase circuit via adjusting ON-time period TONK of the Kth phase circuit.

ON-time control circuit may be implemented via analog approach or via digital approach.

Figure 6A:
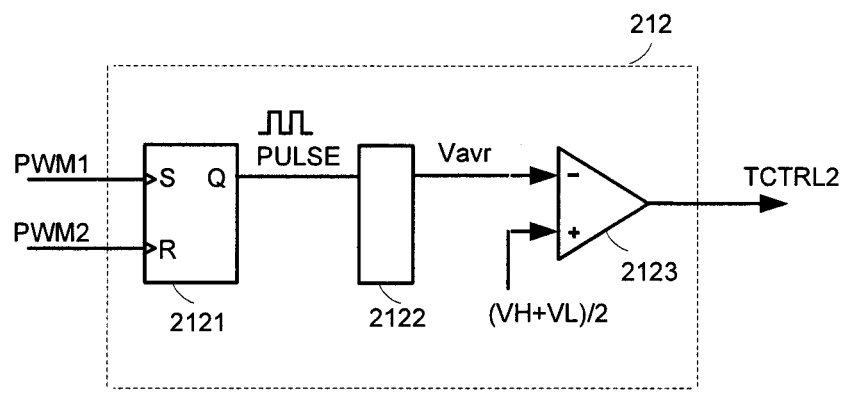
FIG. 6A schematically illustrates an ON-time control circuit implemented via analog approach for dual-phase DC/DC converter 500 in accordance with an embodiment of the present invention.

FIG. 6A schematically illustrates ON-time control circuit 212 implemented via analog approach for dual-phase DC/DC converter 500 in accordance with an embodiment of the present invention. As shown in FIG. 6A, ON-time control circuit 212 is implemented via analog approach. ON-time control circuit 212 comprises an indicating circuit 2121, an averaging circuit 2122 and a comparing circuit 2123.

Indicating circuit 2121 has an input terminal S coupled to drive signal PWM1, an input terminal R coupled to drive signal PWM2, and an output terminal Q configured to provide indicating signal PULSE. Averaging circuit 2122 comprises an input coupled to output terminal Q of indicating circuit 2121, and an output configured to provide average voltage Vavr of indicating signal PULSE within a time period. In one embodiment, the time period comprises a switching period of the first phase circuit or a switching period of the second phase circuit. Comparing circuit 2123 comprises an inverting terminal coupled to the output of averaging circuit 2122, a non-inverting terminal coupled to an interleaving reference signal, and an output configured to provide phase control signal TCTRL2. In one embodiment, for dual-phase converter, a voltage of the interleaving reference signal is an average voltage of HIGH level voltage VH and LOW level voltage VL, i.e., $(VH+VL)/2$. Comparing circuit 2123 is configured to provide phase control signal TCTRL2 via comparing average voltage Vavr with $(VH-VL)/2$. In one embodiment, ON-time period TON2 of the second phase circuit is adjusted responsive to phase control signal TCTRL2. When average voltage Vavr is less than $(VH+VL)/2$, e.g., $Vavr<(VH+VL)/2$, it is indicated that the duration time period of the second phase circuit is longer than the duration time period of the first phase circuit, then ON-time period TON2 is decreased responsive to positive phase control signal TCTRL2. When average voltage Vavr is larger than $(VH+VL)/2$, e.g., $Vavr>(VH+VL)/2$, it is indicated that the duration time period of the second phase circuit is less than the duration time period of the first phase circuit, then ON-time period TON2 is increased responsive to negative phase control signal TCTRL2.

Figure 6B:
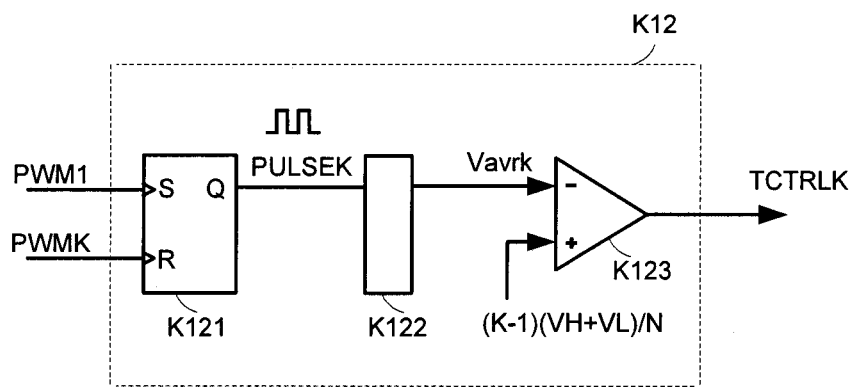
FIG. 6B schematically illustrates an ON-time control circuit implemented via analog approach for a multiphase DC/DC converter comprising N phase circuits in accordance with an embodiment of the present invention.

Similarly, for multiphase converter comprising N phase circuits, a plurality of ON-time control circuits are employed to (N−1) phase circuits. FIG. 6B schematically illustrates ON-time control circuit K12 implemented via analog approach for a multiphase DC/DC converter comprising N phase circuits in accordance with an embodiment of the present invention. As shown in FIG. 6B, ON-time control circuit K12 is implemented via analog approach. ON-time control circuit K12 comprises an indicating circuit K121, an averaging circuit K122 and a comparing circuit K123.

Indicating circuit K121 comprises an input terminal S configured to receive drive signal PWM1, an input terminal R configured to receive drive signal PWMK, and an output terminal Q configured to provide indicating signal PULSEK. Averaging circuit K122 comprises an input coupled to output terminal Q of indicating circuit K121, and an output configured to provide average voltage Vavrk of indicating signal PULSEK within a time period. In one embodiment, the time period comprises a switching period of the master phase circuit or a switching period of the Kth phase circuit. Comparing circuit K123 comprises an inverting terminal coupled to the output of averaging circuit K122, a non-inverting terminal configured to receive an interleaving reference signal, and an output configured to provide phase control signal TCTRLK. In one embodiment, for N phase circuits converter, voltage of the interleaving reference signal is $(K-1)(VH+VL)/N$. Comparing circuit K123 is configured to provide phase control signal TCTRLK via comparing average voltage Vavrk with $(K-1)(VH+VL)/N$. In one embodiment, ON-time period TONK of the Kth phase circuit is adjusted responsive to phase control signal TCTRLK. When average voltage Vavr is less than $(K-1)(VH+VL)/N$, i.e., $Vavr<(K-1)(VH+VL)/N$, it is indicated that the duration time period of the Kth phase circuit is longer than the duration time period of the master phase circuit, then ON-time period TONK is decreased. When Vavr is larger than $(K-1)(VH+VL)/N$, i.e., $Vavr>(K-1)(VH+VL)/N$, it is indicated that the duration time period of the Kth phase circuit is less than the duration time period of the master phase circuit, then ON-time period TONK is increased.

Figure 6C:
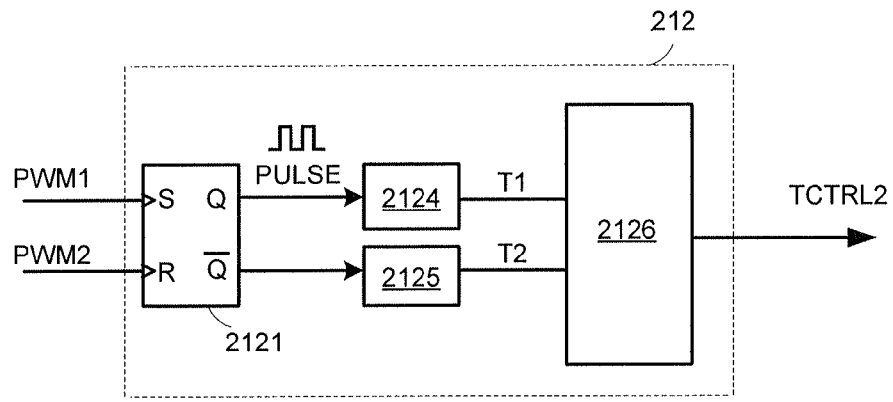
FIG. 6C schematically illustrates an ON-time control circuit implemented via digital approach for dual-phase DC/DC converter 500 in accordance with one embodiment of the present invention.

FIG. 6C schematically illustrates an ON-time control circuit implemented via digital approach for dual-phase DC/DC converter 500 in accordance with one embodiment of the present invention. As shown in FIG. 6C, ON-time control circuit 212 is implemented via digital approach. ON-time control circuit 212 comprises indicating circuit 2121, a counter 2124, a counter 2125, and a comparing circuit 2126.

Indicating circuit 2121 is configured to provide indicating signal PULSE responsive to drive signal PWM1 and drive signal PWM2. Counter 2124 comprises an input configured to receive indicating signal PULSE, and an output configured to provide a count value T1 indicating the time period of HIGH indicating signal PULSE. Counter 2125 comprises an input configured to receive indicating signal PULSE, and an output configured to provide a count value T2 indicating the time period of LOW indicating signal PULSE. Comparing circuit 2126 comprises a first input coupled to the output of counter 2124, a second input coupled to the output of counter 2125, and an output configured to provide phase control signal TCTRL2 via comparing count value T1 with count value T2. When count value T1 is less than count value T2, it is indicated that the duration time period of the second phase circuit is longer than the duration time period of the first phase circuit, then ON-time period TON2 is decreased. When count value T1 is larger than count value T2, it is indicated that the duration time period of the second phase circuit is less than the duration time period of the first phase circuit, then ON-time period TON2 is increased.

Figure 6D:
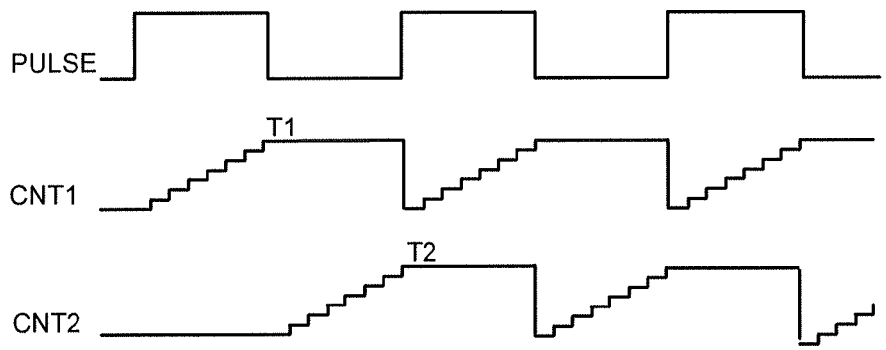
FIG. 6D shows waveforms illustrating signals of ON-time control circuit of FIG. 6C.

FIG. 6D shows waveforms illustrating signals of ON-time control circuit of FIG. 6C. In one embodiment, when indicating signal PULSE is HIGH, counter 2124 (CNT1 shown in FIG. 6D) is configured to count up until indicating signal PULSE becomes LOW, and counter 2124 is configured to provide count value T1 indicating the time period of HIGH indicating signal PULSE. In one embodiment, when indicating signal PULSE is LOW, counter 2125 (CNT2 shown in FIG. 6D) is configured to count up until indicating signal PULSE becomes HIGH, and counter 2125 is configured to provide count value T2 indicating the time period of LOW indicating signal PULSE.

Figure 6E:
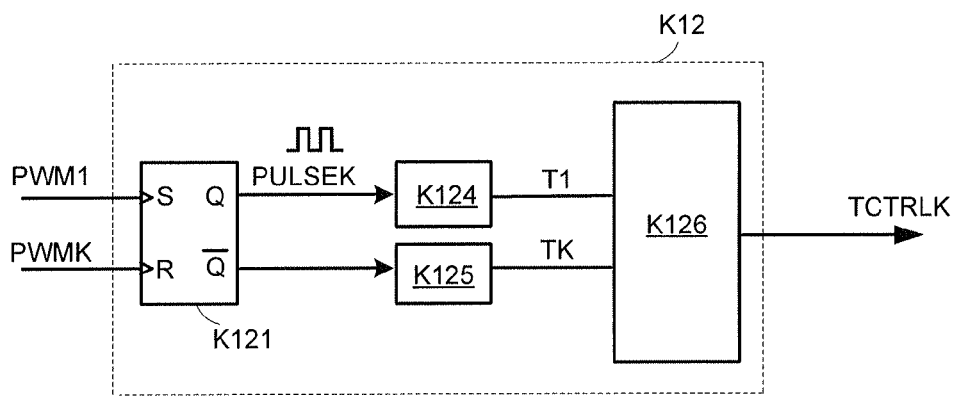
FIG. 6E schematically illustrates an ON-time control circuit implemented via digital approach for a multiphase DC/DC converter comprising N phase circuits in accordance with one embodiment of the present invention.

Similarly, for multiphase converter comprising N phase circuits, ON-time control circuits are employed to (N−1) phase circuits. FIG. 6E schematically illustrates ON-time control circuit K12 implemented via digital approach for a multiphase DC/DC converter comprising N phase circuits in accordance with one embodiment of the present invention. As shown in FIG. 6E, ON-time control circuit K12 is implemented via digital approach. ON-time control circuit K12 comprises indicating circuit K121, a counter K124, a counter K125, and a comparing circuit K126.

Indicating circuit K121 shown in FIG. 6E is configured to provide indicating signal PULSEK responsive to drive signal PWM1 and drive signal PWMK. Counter K124 is employed to indicate the time period of HIGH indicating signal PULSEK and counter K125 is employed to indicate the time period of LOW indicating signal PULSEK. Counter K124 comprises an input configured to receive indicating signal PULSEK, and an output configured to provide a count value T1 indicating the time period of HIGH indicating signal PULSEK. Counter K125 comprises an input configured to receive indicating signal PULSEK, and an output configured to provide a count value TK indicating the time period of LOW indicating signal PULSEK. Comparing circuit K126 comprises a first input coupled to the output of counter K124, a second input coupled to the output of counter K125, and an output configured to provide phase control signal TCTRLK via comparing a first numeric value responsive to count value T1 with a second numeric value responsive to count value TK. In one embodiment, ON-time period TONK of the Kth phase circuit is adjusted responsive to phase control signal TCTRLK. In one embodiment, the first numeric value is T1/(K−1), and the second numeric value is TK/(N−K+1). When T1/(K−1) is less than TK/(N−K+1), it is indicated that the duration time period of the Kth phase circuit is longer than the duration time period of the master phase circuit, then ON-time period TONK is decreased. When T1/(K−1) is larger than TK/(N−K+1), it is indicated that the duration time period of the Kth phase circuit is less than the duration time period of the master phase circuit, then ON-time period TONK is increased.

Figure 7A:
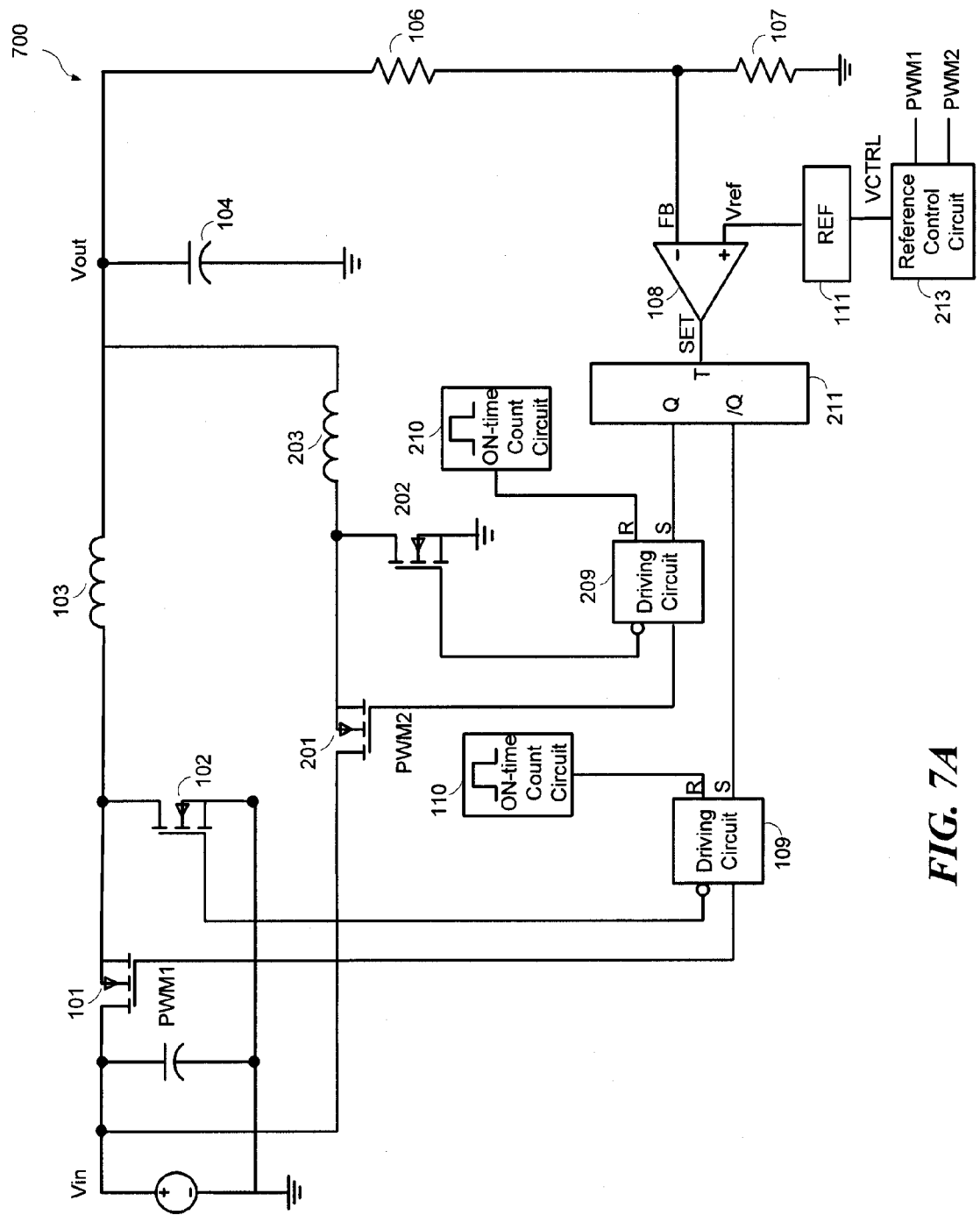
FIG. 7A schematically illustrates a dual-phase DC/DC converter 700 with constant ON-time control in accordance with another embodiment of the present invention.

FIG. 7A schematically illustrates a dual-phase DC/DC converter 700 with constant ON-time control in accordance with another embodiment of the present invention.

Compared with converter 500, a control circuit of converter 700 comprises a reference control circuit 213. Reference control circuit 213 is configured to provide a control signal VCTRL to adjust reference signal Vref of converter 700 to implement symmetry phase interleaving. As shown in FIG. 7, voltage source REF is configured to receive control signal VCTRL to adjust reference signal Vref, and control signal VCTRL is responsive to drive signal PWM1 and drive signal PWM2.

Figure 7B:
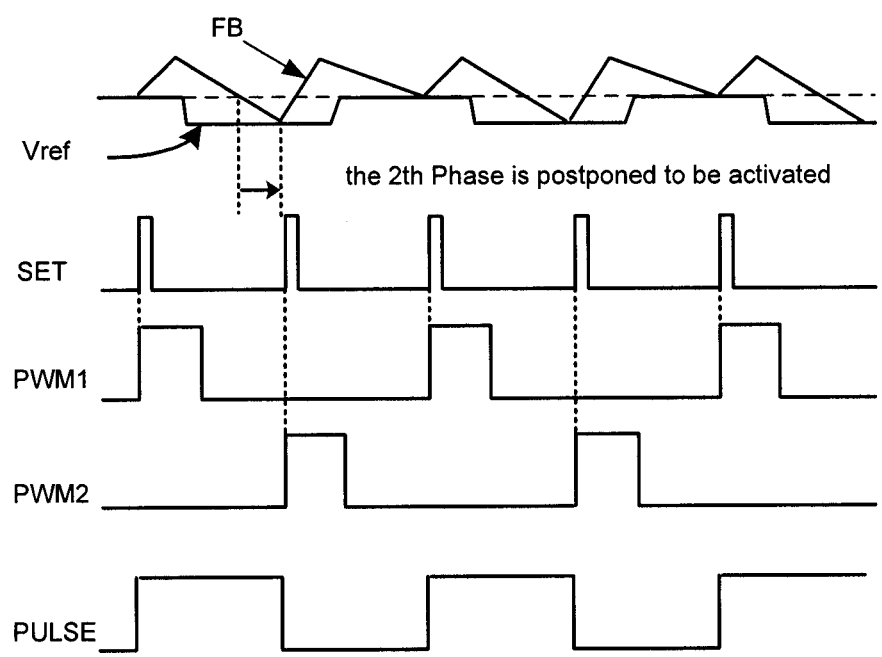
FIG. 7B shows waveforms illustrating signals of converter 700 to adjust a reference signal to implement symmetry phase interleaving.

FIG. 7B shows waveforms illustrating signals of converter 700 to adjust reference signal to implement symmetry phase interleaving. Indicating signal PULSE is provided responsive to drive signal PWM1 and drive signal PWM2. Indicating signal PULSE is flipped at HIGH level voltage VH and LOW level voltage VL alternately when drive signal PWM1 or drive signal PWM2 becomes activated. In the example of FIG. 7B, reference signal Vref is adjusted to control the phase shift of the second phase circuit away from the first phase circuit. For example, when the duration time period of the first phase circuit is shorter than the duration time period of the second phase circuit, average voltage Vavr of indicating signal PULSE is less than (VH+VL)/2, reference signal Vref for the second phase circuit is decreased, as a result, the second phase circuit is postponed to be activated and the duration time period of the first phase circuit is extended. When the duration time period of the first phase circuit is longer than the duration time period of the second phase circuit, reference signal Vref for the second phase circuit is increased. As a result, the second phase circuit is activated in advance and the duration time period of the first phase circuit is shortened. Thus, reference signal Vref for the second phase circuit is adjusted to achieve phase symmetry. In one embodiment as shown in FIG. 7B, reference signal Vref for the second phase circuit is adjusted after the first phase circuit is turned OFF and before the second phase circuit is turned ON.

Similarly, for multiphase converter comprising N phase circuits, wherein N is an integer larger than 1, taking one phase circuit, e.g., the first phase circuit, as the master phase circuit, reference signal Vref for the Kth phase circuit is adjusted via a reference control circuit to achieve uniform phase interleaving. For example, reference signal Vref for the Kth phase circuit is adjusted to postpone or advance activating the Kth phase circuit.

In one embodiment, indicating signal PULSEK is generated to indicate performance of the phase shift of the Kth phase circuit away from the master phase circuit in accordance with drive signal PWM1 and drive signal PWMK. Indicating signal PULSEK is flipped at HIGH level voltage VH and LOW level voltage VL alternately when drive signal PWM1 or drive signal PWMK becomes activated. When the duration time period of the master phase circuit is shorter than the duration time period of the Kth phase circuit, average voltage Vavr of indicating signal PULSEK is less than (K−1)(VH+VL)/N, reference signal Vref for the Kth phase circuit is decreased. When duration time period of the master phase circuit is longer than duration time period of the Kth phase circuit, average voltage Vavr of indicating signal PULSEK is larger than (K−1)(VH+VL)/N, reference signal Vref for the Kth phase circuit is increased.

In one embodiment, reference signal Vref for the Kth phase circuit is adjusted after the previous phase circuit is turned OFF and before the Kth phase circuit is turned ON.

Reference control circuit may be implemented via analog approach or via digital approach.

Figure 8A:
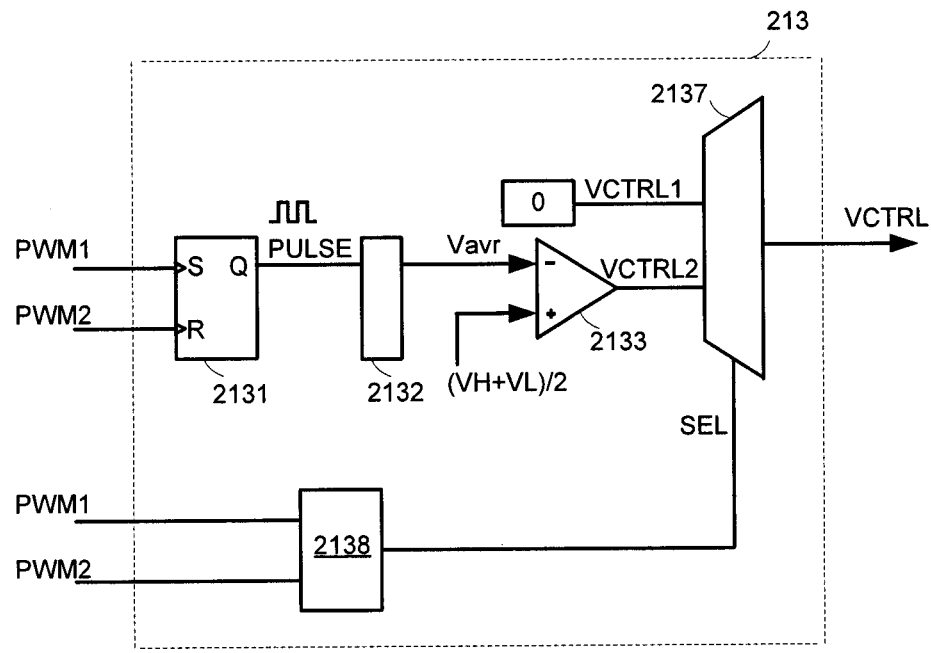
FIG. 8A schematically illustrates a reference control circuit implemented via analog approach for dual-phase DC/DC converter 700 in accordance with an embodiment of the present invention.

FIG. 8A schematically illustrates reference control circuit 213 implemented via analog approach for dual-phase DC/DC converter 700 in accordance with an embodiment of the present invention. As shown in FIG. 8A, reference control circuit 213 is implemented via analog approach. Reference control circuit 213 comprises a phase control circuit, a multiplexer 2137, and a selecting circuit 2138. The phase control circuit comprising an indicating circuit 2131, an averaging circuit 2132 and a comparing circuit 2133, is configured to provide a phase control signal VCTRL2 to adjust reference signal Vref for the second phase circuit.

Indicating circuit 2131 is configured to provide indicating signal PULSE responsive to drive signal PWM1 and drive signal PWM2. Indicating signal PULSE is flipped at HIGH level voltage VH and LOW level voltage VL alternately when drive signal PWM1 or drive signal PWM2 becomes activated. Averaging circuit 2132 is configured to provide average voltage Vavr of indicating signal PULSE within a time period. In one embodiment, the time period comprises a switching period of the first phase circuit or a switching period of the second phase circuit. Comparing circuit 2133 is configured to provide phase control signal VCTRL2 via comparing average voltage Vavr with (VH+VL)/2. In one embodiment, phase control signal VCTRL2 is configured to adjust reference signal Vref for the second phase circuit. When average voltage Vavr is less than (VH+VL)/2, i.e., Vavr<(VH−VL)/2, it is indicated that the duration time period of the second phase circuit is longer than the duration time period of the first phase circuit, then reference signal Vref for the second phase circuit is decreased. Otherwise, when average voltage Vavr is larger than (VH+VL)/2, i.e., Vavr>(VH+VL)/2, it is indicated that the duration time period of the second phase circuit is less than the duration time period of the first phase circuit, then reference signal Vref for the second phase circuit is increased.

In one embodiment, reference signal Vref for the first phase circuit equals a predetermined initial reference and a phase control signal VCTRL1 with a constant value "0" may be employed to adjust reference signal Vref for the first phase circuit. Multiplexer 2137 comprises a control terminal configured to receive a selecting signal SEL, a first input configured to receive phase control signal VCTRL1, a second input configured to receive phase control signal VCTRL2, and an output coupled to voltage source REF to provide control signal VCTRL. In one embodiment, phase control signal VCTRL1 with a constant value "0" indicates that reference signal Vref for the first phase circuit is the same as the predetermined initial reference. Based on selecting signal SEL, multiplexer 2137 is configured to choose one of the phase control signals VCTRL1 and VCTRL2 as control signal VCTRL. Selecting circuit 2138 comprises a first input configured to receive drive signal PWM1, a second input configured to receive drive signal PWM2, and an output configured to provide selecting signal SEL. In one embodiment, selecting signal SEL is provided based on drive signal PWM1 and drive signal PWM2. In one embodiment, selecting signal SEL is configured to select phase control signal VCTRL2 as control signal VCTRL after drive signal PWM1 becomes deactivated and before drive signal PWM2 becomes activated. In one embodiment, selecting signal SEL is configured to select phase control signal VCTRL1 as control signal VCTRL after drive signal PWM2 becomes deactivated and before drive signal PWM1 becomes activated.

Figure 8B:
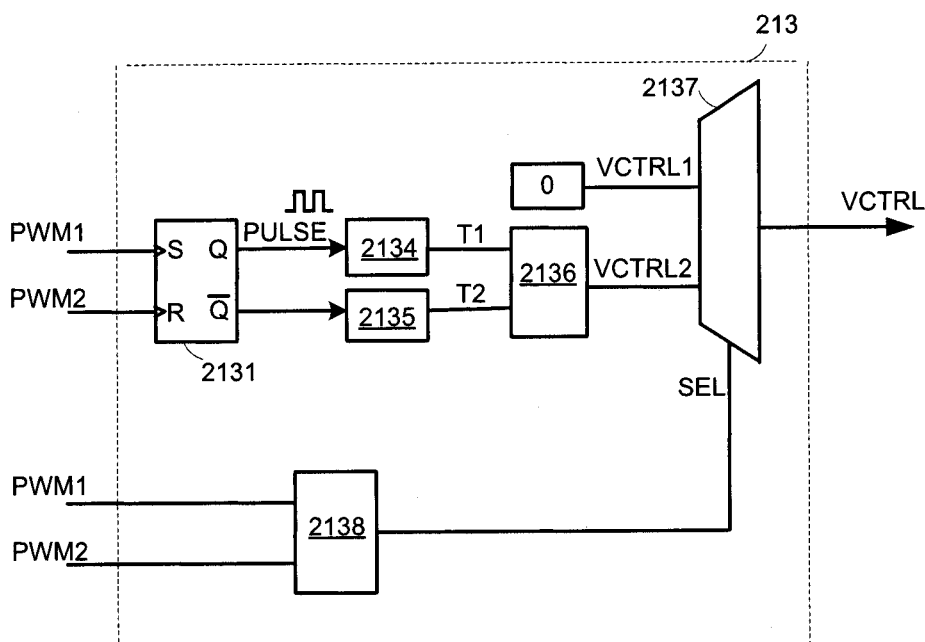
FIG. 8B schematically illustrates a reference control circuit implemented via digital approach for dual-phase DC/DC converter 700 in accordance with an embodiment of the present invention.

FIG. 8B schematically illustrates reference control circuit 213 implemented via digital approach for dual-phase DC/DC converter 700 in accordance with an embodiment of the present invention. As shown in FIG. 8B, reference control circuit 213 is implemented via digital approach. Reference control circuit 213 comprises a phase control circuit, a multiplexer 2137, and a selecting circuit 2138. The phase control circuit comprising an indicating circuit 2131, a counter 2134, a counter 2135 and a comparing circuit 2136, is configured to provide phase control signal VCTRL2 to adjust reference signal Vref for the second phase circuit. Indicating circuit 2131, multiplexer 2137 and selecting circuit 2138 are the same as previous description as shown in FIG. 8A, only differences between FIG. 8A and FIG. 8B are described below.

Counter 2134 is configured to provide a count value T1 indicating the time period of HIGH indicating signal PULSE. Counter 2135 is configured to provide a count value T2 indicating the time period of LOW indicating signal PULSE. Comparing circuit 2136 comprises a first input configured to receive count value T1, a second input configured to receive count value T2, and an output configured to provide phase control signal VCTRL2 via comparing count value T1 with count value T2. In one embodiment, phase control signal VCTRL2 is configured to adjust reference signal Vref for the second phase circuit. When count value T1 is less than count value T2, it is indicated that the duration time period of the second phase circuit is longer than the duration time period of the first phase circuit, and then reference signal Vref for the second phase circuit is decreased. Otherwise, when count value T1 is larger than count value T2, it is indicated that the duration time period of the second phase circuit is less than the duration time period of the first phase circuit, and then reference signal Vref for the second phase circuit is increased.

Similarly, for multiphase converter comprising N phase circuits, reference signal Vref is adjusted to achieve phase symmetry. In one embodiment, reference signal Vref for a master phase circuit, e.g., the first phase circuit, is the same as the predetermined initial reference, and reference signal Vref for the Kth phase circuit is adjusted responsive to drive signal PWM1 and drive signal PWMK. In one embodiment, reference signal Vref for the Kth phase circuit is adjusted to postpone or advance activating the Kth phase circuit. In one embodiment, a phase control signal VCTRLK is employed to adjust reference signal Vref for the Kth phase circuit. Phase control signal VCTRLK may be generated via analog approach or via digital approach.

Figure 8C:
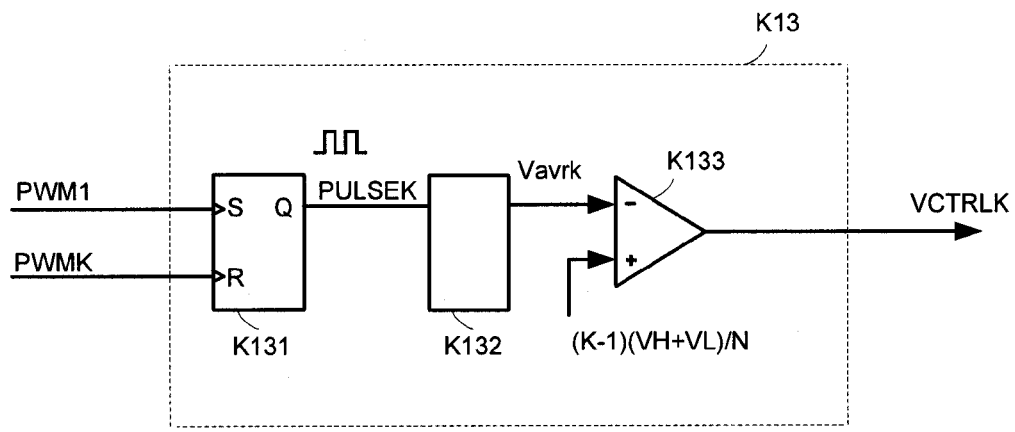
FIG. 8C schematically illustrates a phase control circuit implement via analog approach for a phase circuit of a multiphase DC/DC converter comprising N phase circuits in accordance with an embodiment of the present invention.

FIG. 8C schematically illustrates a phase control circuit implement via analog approach for a phase circuit of a multiphase DC/DC converter comprising N phase circuits in accordance with an embodiment of the present invention. A phase control circuit K13 is configured to provide phase control signal VCTRLK to adjust reference signal for the Kth phase circuit. As shown in FIG. 8C, phase control circuit K13 comprises an indicating circuit K131, an averaging circuit K132, and a comparing circuit K133.

Indicating circuit K131 is configured to provide indicating signal PULSEK responsive to drive signal PWM1 and drive signal PWMK. Indicating signal PULSEK is flipped at HIGH level voltage VH and LOW level voltage VL alternately when drive signal PWM1 or drive signal PWMK becomes activated. Averaging circuit K132 is configured to provide average voltage Vavrk of indicating signal PULSEK within a time period. In one embodiment, the time period comprises a switching period of the master phase circuit or a switching period of the Kth phase circuit. Comparing circuit K133 is configured to provide phase control signal VCTRLK via comparing average voltage Vavrk with an interleaving reference signal. In one embodiment, the interleaving reference signal may be (K−1)(VH+VL)/N. In one embodiment, phase control signal VCTRLK is configured to adjust reference signal Vref for the Kth phase circuit. When average voltage Vavrk is less than (K−1)(VH+VL)/N, it is indicated that the duration time period of the Kth phase circuit is longer than the duration time period of the master phase circuit, then reference signal Vref for the Kth phase circuit is decreased. Otherwise, when average voltage Vavrk is larger than (K−1)(VH+VL)/N, it is indicated that the duration time period of the Kth phase circuit is less than the duration time period of the master phase circuit, then reference signal Vref for the Kth phase circuit is increased.

Figure 8D:
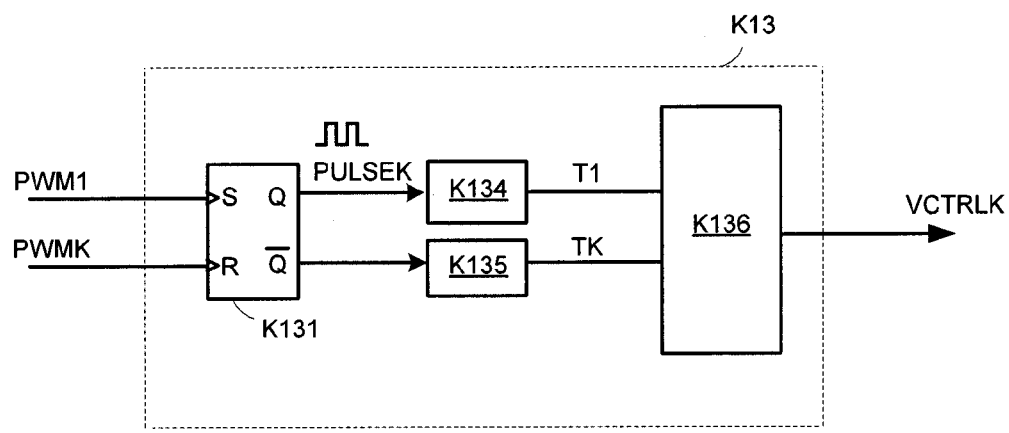
FIG. 8D schematically illustrates a phase control circuit implement via digital approach for a phase circuit of a multiphase DC/DC converter comprising N phase circuits in accordance with an embodiment of the present invention.

FIG. 8D schematically illustrates a phase control circuit implement via digital approach for a phase circuit of a multiphase DC/DC converter comprising N phase circuits in accordance with an embodiment of the present invention. Phase control circuit K13 is configured to provide phase control signal VCTRLK to adjust reference signal for the Kth phase circuit. As shown in FIG. 8D, Phase control circuit K13 comprises an indicating circuit K131, a counter K134, a counter K135, and a comparing circuit K136.

Similarly, indicating circuit K131 is configured provide indicating signal PULSEK responsive to drive signal PWM1 and drive signal PWMK. Counter K134 is configured to provide a count value T1 indicating the time period of HIGH indicating signal PULSEK. Counter K135 is configured to provide a count value TK indicating the time period of LOW indicating signal PULSEK. Comparing circuit K136 comprises a first input configured to receive count value T1, a second input configured to receive count value TK, and an output configured to provide phase control signal VCTRLK via comparing T1/(K−1) with TK/(N−K+1). In one embodiment, phase control signal VCTRLK is configured to adjust reference signal Vref for the Kth phase circuit. When T1/(K−1)<TK/(N−K+1), it is indicated that the duration time period of the Kth phase circuit is longer than the duration time period of the master phase circuit, then reference signal Vref for the Kth phase circuit is decreased. Otherwise, when T1/(K−1)>TK/(N−K+1), it is indicated that the duration time period of the Kth phase circuit is less than the duration time period of the master phase circuit, then reference signal Vref for the Kth phase circuit is increased.

Figure 8E:
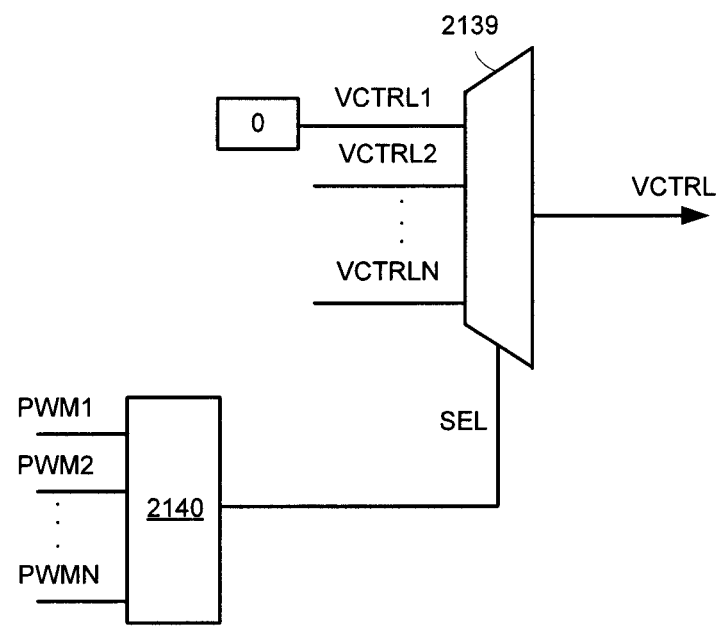
FIG. 8E schematically illustrates a reference control circuit of a multiphase DC/DC converter comprising N phase circuits in accordance with an embodiment of the present invention.

FIG. 8E schematically illustrates a reference control circuit of a multiphase DC/DC converter comprising N phase circuits in accordance with an embodiment of the present invention. As shown in FIG. 8E, control signal VCTRL is provided via a multiplexer 2139, and a selecting circuit 2140. In one embodiment, control signal VCTRL is employed to adjust reference signal Vref to achieve phase symmetry.

Multiplexer 2139 comprises a control terminal configured to receive a selecting signal SEL, a plurality of inputs configured to receive phase control signals VCTRL1, VCTRL2, . . . VCTRLN, and an output configured to provide control signal VCTRL. In one embodiment, phase control signal VCTRL1 with a constant value (e.g., "0") indicates that reference signal Vref for the master phase circuit is the same as the predetermined initial reference. Multiplexer 2139 is configured to choose one of the phase control signals VCTRL1, VCTRL2, . . . VCTRLN as control signal VCTRL in responsive to selecting signal SEL. In one embodiment, VCTRL=VCTRL1 when selecting signal SEL="1", VCTRL=VCTRL2 when selecting signal SEL="2", and so on, i.e., VCTRL=VCTRLK when selecting signal SEL="K". In one embodiment, selecting signal SEL is provided responsive to drive signals of each phase circuit. In one embodiment, selecting signal SEL is configured to select phase control signal VCTRLK for the Kth phase circuit as control signal VCTRL after drive signal of previous phase circuit becomes deactivated and before drive signal of the Kth phase circuit becomes activated. In one embodiment, selecting signal SEL is configured to select phase control signal VCTRL1 after a drive signal PWMN of the Nth phase circuit becomes deactivated and before drive signal PWM1 becomes activated. Selecting circuit 2140 has a plurality of inputs configured to receive drive signals PWM1, PWM2, . . . PWMN and an output configured to provide selecting signal SEL.

As described previous, for a multiphase converter comprising N phase circuits, phase control signals are provided to each phase circuit except the master phase circuit. A phase control signal is configured to adjust a circuit parameter for a phase circuit. The phase control signal for the phase circuit is responsive to a drive signal of the master phase circuit and a drive signal of the phase circuit. In one embodiment, the phase control signal is coupled to an ON-time count circuit of the phase circuit to adjust an ON-time period of the phase circuit, and as a result, a duration time period of the phase circuit is adjusted. In another embodiment, the phase control signal is configured to adjust a reference signal for the phase circuit, and as a result, the duration time period of the phase circuit is adjusted.

The above description and discussion about specific embodiments of the present technology is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

We claim:

1. A multiphase converter having an input configured to receive an input voltage and having an output configured to provide an output voltage, the multiphase converter comprising: a plurality of phase circuits, wherein each phase circuit having an input coupled to the input of the multiphase converter and an output coupled to the output of the multiphase converter, wherein each phase circuit comprising a switch having a control terminal, and wherein the control terminal of the switch is configured to receive a drive signal; and a control circuit, configured to provide a plurality of drive signals, the control circuit comprising: a phase control circuit, corresponding to one of the phase circuits, wherein the phase control circuit having a first input terminal and an output terminal, wherein the first input terminal is configured to receive a drive signal of the corresponding phase circuit, and the output terminal is configured to provide a phase control signal, wherein the phase control signal is configured, based on the drive signal of the corresponding phase circuit, to adjust an ON-time period for the corresponding phase circuit or to adjust a reference signal for the corresponding phase circuit; wherein one of the phase circuits is configured as a master phase circuit, and wherein the phase control circuit further comprises: a second input terminal, configured to receive a drive signal of the master phase circuit; an indicating circuit, having a first input, a second input and an output, wherein the first input is configured to receive the drive signal of the master phase circuit, wherein the second input is configured to receive the drive signal of the corresponding phase circuit, and wherein the output is configured to provide an indicating signal, and further wherein the indicating signal turns to a first state when the drive signal of the master phase circuit becomes activated, and turns to a second state when the drive signal of the corresponding phase circuit becomes activated; an averaging circuit, having an input and an output, wherein the input is coupled to the output of the indicating circuit, and wherein the output is configured to provide an average voltage of the indicating signal within a time period; and a comparing circuit, having an inverting terminal, a non-inverting terminal and an output, wherein the inverting terminal is coupled to the output of the averaging circuit to receive the average voltage, and wherein the non-inverting terminal is configured to receive an interleaving reference signal, and based on the average voltage and the interleaving reference signal the output is configured to provide the phase control signal.

2. The multiphase converter of claim 1, wherein the interleaving reference signal is represented by an equation: $(K-1)(VH+VL)/N$, where VH represents a voltage of the indicating signal at the first state, VL represents a voltage of the indicating signal at the second state, N represents the number of phase circuits of the multiphase converter, and K represents the corresponding phase circuit, and where K is an integer within the range of 2 to N.

3. The multiphase converter of claim 1, wherein the control circuit further comprises:
- a multiplexer, having a control terminal configured to receive a selecting signal, a plurality of inputs configured to receive phase control signals, and an output configured to provide a control signal, wherein based on the selecting signal, the control signal is configured to be one of the phase control signals;
- a selecting circuit, having a plurality of inputs configured to receive the drive signals, and an output configured to provide the selecting signal; and
- a voltage source, having an input and an output, wherein the input is coupled to the output of the multiplexer to receive the control signal, and the output is configured to provide the reference signal, and wherein the control signal is configured to adjust the reference signal.

4. The multiphase converter of claim 1, wherein one of the phase circuits is configured as a master phase circuit, and wherein each phase control circuit further comprises:
- a second input terminal, configured to receive a drive signal of the master phase circuit;
- an indicating circuit, having a first input, a second input and an output, wherein the first input is configured to receive the drive signal of the master phase circuit, wherein the second input is configured to receive the drive signal of the corresponding phase circuit, and wherein the output is configured to provide an indicating signal, and further wherein the indicating signal turns to a first state when the drive signal of the master phase circuit becomes activated, and turns to a second state when the drive signal of the corresponding phase circuit becomes activated;
- a first counter, having an input and an output, wherein the input is coupled to the output of the indicating circuit to receive the indicating signal, and wherein the output is configured to provide a first count value indicating a time period of the indicating signal at the first state;
- a second counter, having an input and an output, wherein the input is coupled to the output of the indicating circuit to receive the indicating signal, and wherein the output is configured to provide a second count value indicating a time period of the indicating signal at the second state; and
- a comparing circuit, having a first input, a second input and an output, wherein the first input is coupled to the output of the first counter to receive the first count value, the second input is coupled to the output of the second counter to receive the second count value, and the output is configured to provide the phase control signal, and further wherein the phase control signal is configured to be generated via comparing a first numeric value with a second numeric value, wherein the first numeric value is responsive to the first count value, and wherein the second numeric value is responsive to the second count value.

5. The multiphase converter of claim 4, wherein the first numeric value is represented by an equation: $T1/(K-1)$, wherein the second numeric value is represented by an equation: $TK/(N-K+1)$, where T1 represents the first count value, TK represents the second count value, N represents the number of phase circuits of the multiphase converter, and K represents the corresponding phase circuit, and where K is an integer within the range of 2 to N.

6. The multiphase converter of claim 4, wherein the control circuit further comprises:
- a multiplexer, having a control terminal configured to receive a selecting signal, a plurality of inputs configured to receive phase control signals, and an output configured to provide a control signal, based on the selecting signal, the control signal is configured to be one of the phase control signals;
- a selecting circuit, having a plurality of inputs configured to receive the drive signals, and an output configured to provide the selecting signal; and
- a voltage source, having an input and an output, wherein the input is coupled to the output of the multiplexer to receive the control signal, and the output is configured to provide the reference signal, and wherein the control signal is configured to adjust the reference signal.

7. The multiphase converter of claim 1, wherein one of the phase circuits is configured as a master phase circuit and other phase circuits are configured as slave phase circuits, and wherein an ON-time period for a slave phase circuit is controlled to adjust a phase shift of the slave phase circuit away from the master phase circuit.

8. The multiphase converter of claim 7, further comprising a plurality of ON-time count circuits, each ON-time count circuit corresponding to one of the slave phase circuits, wherein each ON-time count circuit comprises:
- an input configured to receive a phase control signal of the corresponding slave phase circuit; and
- an output configured to provide an ON-time period based on the phase control signal of the corresponding slave phase circuit.

9. The multiphase converter of claim 1, wherein the reference signal is adjusted to achieve approximate phase symmetry.

10. The multiphase converter of claim 9, further comprising a voltage source, wherein the voltage source comprises:
- an input configured to receive the phase control signal; and
- an output configured to provide the reference signal for the corresponding phase circuit, wherein the reference signal is adjusted before the corresponding phase circuit is activated.

11. The multiphase converter of claim 1, wherein the control circuit further comprises:
- a comparator, having an inverting terminal, a non-inverting terminal, and an output, wherein the inverting terminal is coupled to the output of the multiphase converter to receive a feedback signal of the output voltage, wherein the non-inverting terminal is configured to receive the reference signal, and based on the reference signal and the feedback signal, the output is configured to provide a set signal;
- a frequency divider, having an input and a plurality of outputs, wherein the input is coupled to the output of the comparator;
- an ON-time count circuit, having an output configured to provide an ON-time period; and
- a plurality of driving circuits, each driving circuit corresponding to one of the phase circuits, wherein each driving circuit having a first input, a second input and an output, and wherein the first input is coupled to one of the outputs of the frequency divider, the second input is configured to receive the ON-time period, and the output is configured to provide the drive signal to the corresponding phase circuit.

12. A phase control method for a phase circuit of a multiphase converter, wherein the multiphase converter comprising a plurality of phase circuits, and one of the phase circuits is configured as a master phase circuit, the phase control method comprising: providing an indicating signal to indicate a phase shift of the phase circuit away from the master phase circuit, wherein the indicating signal turns to a first state when the master phase circuit becomes activated and wherein the indicating signal turns to a second state when the phase circuit becomes activated; providing a phase control signal to the phase circuit based on a time period of the indicating signal at the first state and a time period of the indicating signal at the second state; and adjusting a circuit parameter for the phase circuit based on the phase control signal to adjust the phase shift of the phase circuit away from the master phase circuit; wherein providing the phase control signal comprises: (a) providing a first count value indicating a time period of the indicating signal at the first state; (b) providing a second count value indicating a time period of the indicating signal at the second state; and (c) providing the phase control signal via comparing a first numeric value with a second numeric value, wherein the first numeric value is responsive to the first count value, and the second numeric value is responsive to the second count value.

13. The method of claim 12, wherein providing the phase control signal comprises:
providing an average voltage of the indicating signal within a time period; and
providing the phase control signal via comparing the average voltage with an interleaving reference signal, wherein the interleaving reference signal is responsive to the indicating signal.

14. The method of claim 12, wherein adjusting the circuit parameter comprises adjusting a reference signal for the phase circuit.

15. A phase control circuit for a phase circuit of a multiphase converter, wherein the multiphase converter comprising a plurality of phase circuits, and one of the phase circuits is configured as a master phase circuit, wherein the master phase circuit is controlled via a first drive signal and the phase circuit is controlled via a second drive signal, the phase control circuit comprising: a first input configured to receive the first drive signal; a second input configured to receive the second drive signal; an output configured to provide a phase control signal for the phase circuit based on the first drive signal and the second drive signal, wherein the phase control signal is configured to adjust a circuit parameter for the phase circuit to adjust a phase shift of the phase circuit away from the master phase circuit; an indicating circuit, having a first input, a second input and an output, wherein the first input is configured to receive the first drive signal, the second input is configured to receive the second drive signal, and the output is configured to provide an indicating signal, and further wherein the indicating signal turns to a first state when the first drive signal becomes activated, and the indicating signal turns to a second state when the second drive signal becomes activated; an averaging circuit, having an input and an output, wherein the input is configured to receive the indicating signal, and the output is configured to provide an average voltage of the indicating signal within a time period; and a comparing circuit, having an inverting terminal, a non-inverting terminal and an output, wherein the inverting terminal is coupled to the output of the averaging circuit, the non-inverting terminal is configured to receive an interleaving reference signal, and the output is configured to provide the phase control signal for the phase circuit, and wherein the interleaving reference signal is responsive to a voltage of the indicating signal at the first state and a voltage of the indicating signal at the second state.

16. The phase control circuit of claim 15, wherein the circuit parameter comprising a reference signal for the phase circuit, and wherein an output voltage of the multiphase converter is regulated approximate to the reference signal.

17. The phase control circuit of claim 15, further comprising:
an indicating circuit, having a first input, a second input and an output, wherein the first input is configured to receive the first drive signal, the second input is configured to receive the second drive signal, and the output is configured to provide an indicating signal, and further wherein the indicating signal turns to a first state when the first drive signal becomes activated, and the indicating signal turns to a second state when the second drive signal becomes activated;
a first counter, having an input and an output, wherein the input is configured to receive the indicating signal, and the output is configured to provide a first count value indicating a time period of the indicating signal at the first state;
a second counter, having an input and an output, wherein the input is configured to receive the indicating signal, and the output is configured to provide a second count value indicating a time period of the indicating signal at the second sate; and
a comparing circuit, having a first input, a second input and an output, wherein the first input is coupled to the output of the first counter, the second input is coupled to the output of the second counter, and the output is configured to provide the phase control signal via comparing a first numeric value with a second numeric value, and further wherein the first numeric value is responsive to the first count value and the second numeric value is responsive to the second count value.

* * * * *